United States Patent
Viklund et al.

(10) Patent No.: US 12,515,412 B2
(45) Date of Patent: Jan. 6, 2026

(54) METHOD FOR MANUFACTURING AN ARTICLE ON TOP OF A BASE DEVICE

(71) Applicant: SANDVIK MACHINING SOLUTIONS AB, Sandviken (SE)

(72) Inventors: Per Viklund, Sandviken (SE); Ville-Pekka Matilainen, Sandviken (SE)

(73) Assignee: Sandvik Machining Solutions AB, Sandviken (SE)

( * ) Notice: Subject to any disclaimer, the term of this patent is extended or adjusted under 35 U.S.C. 154(b) by 70 days.

(21) Appl. No.: 18/037,181

(22) PCT Filed: Nov. 16, 2021

(86) PCT No.: PCT/EP2021/081785
§ 371 (c)(1),
(2) Date: May 16, 2023

(87) PCT Pub. No.: WO2022/106389
PCT Pub. Date: May 27, 2022

(65) Prior Publication Data
US 2024/0017498 A1 Jan. 18, 2024

(30) Foreign Application Priority Data
Nov. 17, 2020 (EP) .................................. 20208094

(51) Int. Cl.
*B29C 64/40* (2017.01)
*B29C 64/153* (2017.01)
*B29C 64/245* (2017.01)
*B33Y 10/00* (2015.01)
*B33Y 30/00* (2015.01)

(52) U.S. Cl.
CPC ............ *B29C 64/40* (2017.08); *B29C 64/153* (2017.08); *B29C 64/245* (2017.08); *B33Y 10/00* (2014.12); *B33Y 30/00* (2014.12)

(58) Field of Classification Search
CPC .. B29C 4/40; B29C 4/13; B29C 4/245; B33Y 10/00
USPC ........................................................ 264/308
See application file for complete search history.

(56) References Cited

U.S. PATENT DOCUMENTS

| | | |
|---|---|---|
| 10,286,451 B2 | 5/2019 | Hart et al. |
| 10,766,190 B2 | 9/2020 | Weaver et al. |
| 2020/0238446 A1 | 7/2020 | Worthing et al. |

FOREIGN PATENT DOCUMENTS

| | | |
|---|---|---|
| EP | 3243583 A1 | 11/2017 |
| EP | 3715020 A1 | 9/2020 |
| EP | 3715022 A1 | 9/2020 |

*Primary Examiner* — Christina A Johnson
*Assistant Examiner* — Xue H Liu
(74) *Attorney, Agent, or Firm* — Corinne R. Gorski

(57) ABSTRACT

A method for manufacturing an article requiring support on top of a base device using an additive manufacturing process in an additive manufacturing device having a build plate, is provided. The build plate includes a receptacle arranged for receiving the base device and an insert, provided in proximity to the base device. The insert is arranged for having a support for the article manufactured thereon. The method includes the step of manufacturing the article on top of the base device, and manufacturing the support for the article on top of the insert.

7 Claims, 4 Drawing Sheets

METHOD FOR MANUFACTURING AN ARTICLE ON TOP OF A BASE DEVICE

RELATED APPLICATION DATA

This application is a § 371 National Stage Application of PCT International Application No. PCT/EP2021/081785 filed Nov. 16, 2021 claiming priority to EP 20208094.1 filed Nov. 17, 2020.

TECHNICAL FIELD

The present disclosure relates generally to methods for manufacturing an article using an additive manufacturing process, particularly for manufacturing an article on top of a base device.

BACKGROUND

Additive manufacturing, also known as 3D printing, generally involves manufacturing, or printing, one layer at a time using specialized systems. In particular, a layer of material may be deposited on the working surface of a build chamber and bonded with another layer of the same or of a different material. Additive manufacturing may be used to manufacture articles from computer-aided design models using techniques such as powder bed fusion (PBF).

In some applications, additive manufacturing may be used to manufacture an article on top of a pre-manufactured base device, commonly referred to as a blank, and such articles are often referred to as hybrid articles.

In the case where the article to be manufactured is a cutting tool, and the base device is a machine tool interface, the blank is often placed in a fixture inside the additive manufacturing device, and after the printing each hybrid article can be removed from the machine as a single unit without having to cut them loose from the build plate. However, a drawback related to this is that it becomes difficult to use the type of overhang supports that are normally used in printing, which are built between the article to be manufactured and the build plate. If such supports are used, the finished hybrid articles cannot be removed from the build plate without also removing the support from the build plate, e.g. by cutting or grinding, which affects the surface of the build plate, such that a recalibration would be required after each such operation.

Consequently, there exists a need for improvement when it comes to manufacturing of hybrid articles.

SUMMARY

It is an object of the invention to address at least some of the problems and issues outlined above. An object of embodiments of the invention is to provide a better method for manufacturing hybrid articles requiring support. Another object is to provide a method in which the build plate does not require reprocessing after a manufacturing process. Yet another object is to provide an improved build plate for additive manufacturing processes.

According to one aspect, a method for manufacturing an article requiring support on top of a base device using an additive manufacturing process in an additive manufacturing device is provided. The additive manufacturing device comprises a build plate, the build plate comprising a receptacle for receiving the base device and an insert. The insert is provided in proximity to each base device and is adapted for having a support for the article manufactured thereon. The method process comprises a step of manufacturing the article on top of the base device, and a step of manufacturing the support for the article on top of the insert.

According to another aspect, a build plate for an additive manufacturing device is provided. The build plate comprises a receptacle for receiving a base device and an insert, provided in proximity to each base device and being adapted for having a support for the article manufactured thereon.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The present disclosure relates to manufacturing an article on top of a base device using an additive manufacturing process, such as a Powder Bed Fusion, PBF, process, in an additive manufacturing device comprising a modified build plate, wherein the article requires support. The build plate comprises a bottom plate with a receptacle, wherein the receptacle is adapted for receiving and holding a base device, on top of which an article is to be manufactured. The build plate further comprises an insert adapted for having a support for the article manufactured thereon; The additive manufacturing process then comprises the steps of manufacturing an article on top of the base device, and manufacturing a support for the article on the insert.

For some hybrid articles, a support is required during the manufacturing process in order to be able to manufacture the article at all, or at least in order to manufacture it without distortion of the article. The term "article requiring support" denotes such an article throughout this disclosure. This is especially relevant when manufacturing hybrid articles with overhang portions which are greater than a certain angle, usually around 45 degrees, which is one example of an article requiring support. However, since hybrid articles are not manufactured directly onto a build plate, but instead on top of a base device, it is unfavorable to manufacture such a support directly onto the build plate.

An insight underlying the present disclosure is that by providing an intermediate layer, e.g. in the form of an insert, in between the build plate where the base device is fixtured and the article to be manufactured on top of the base device, it becomes possible to manufacture additional features, such as a support for the article being manufactured, without impacting the build plate in such a way that it needs to be modified or reprocessed after each manufacturing process. Since the support portion is not part of the finished article, it needs to be removed afterwards, and this affects the build plate, usually in such a way that it needs to be reprocessed after each manufacturing process. This is especially relevant in cases where the article to be manufactured comprises an overhang portion with a relatively low angle, e.g. below 45 degrees, since such overhang portions are difficult or impossible to manufacture without using a support for the overhang portion.

Figure 1:
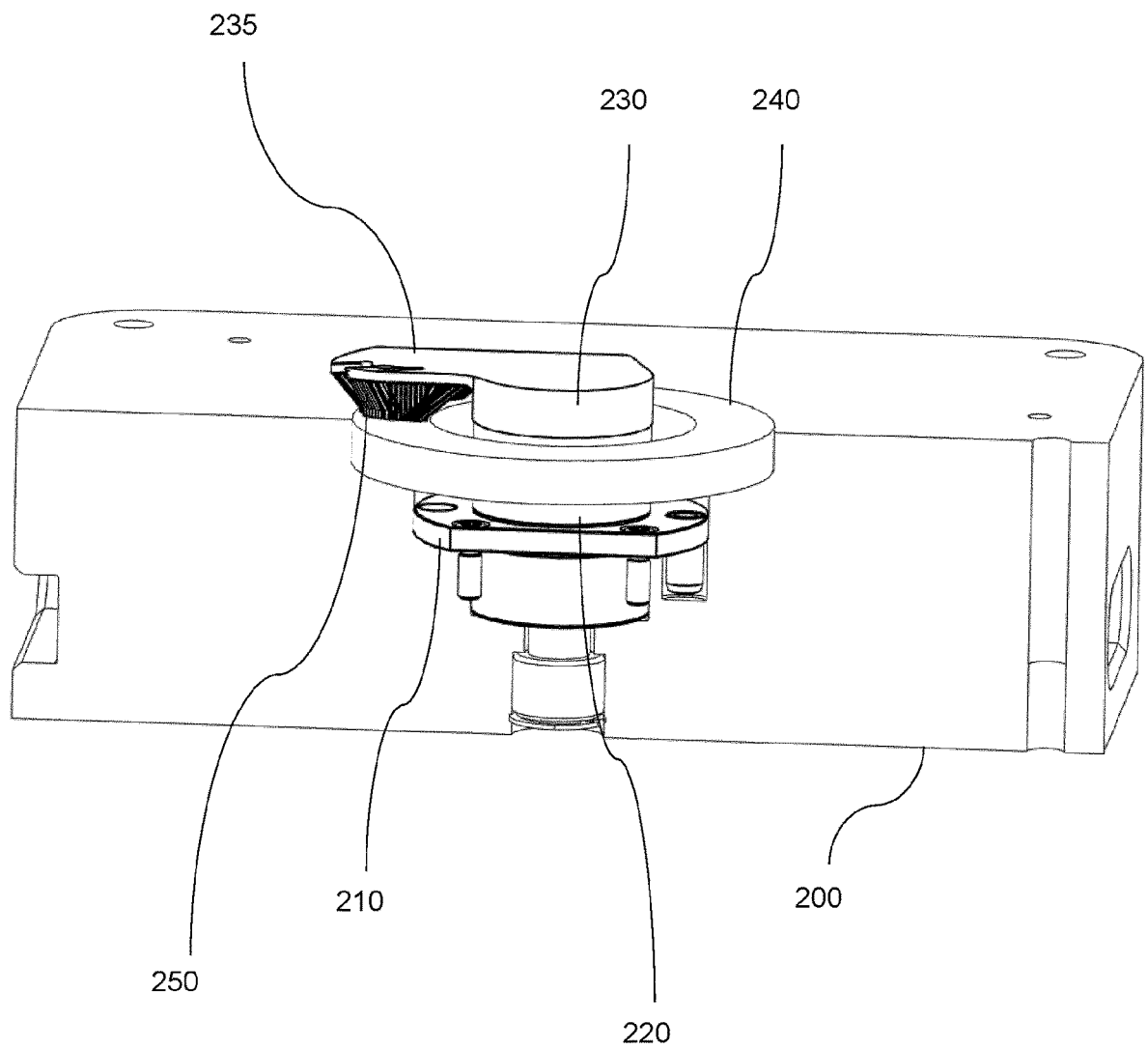
FIG. 1 shows a view of a build plate according to an embodiment.

Looking now at FIG. 1, a cross section of a build plate according to an embodiment, used when performing methods according to the present disclosure, will now be described more in detail.

The build plate 200 comprises a receptacle 210 adapted for receiving a base device 220. The receptacle 210 may be any type of receptacle, and is adapted based on which type of base device 220 it is intended to receive. In some embodiments, the receptacle 210 is a hole in the build plate, for example in embodiments wherein the base device has a conical or cylindrical shape. In other embodiments the receptacle 210 may be fastened to the build plate 200 with fastening devices such as screws. In some embodiments, the receptacle 210 may further comprise additional fastening devices for securing the base device in the receptacle. In some embodiments, the receptacle may simply be a designated location on the build plate, without additional or modified physical structures.

The base device 220 is a device upon which an article is to be manufactured using additive manufacturing technologies. The base device 220 may for example be a drill and the article to be manufactured on top of the drill may be a drill tip. According to some embodiments, the base device is a generic machine interface, such as a Capto, HSK or similar, and the tool is a turning tool. The base device 220 is intended to be a part of the finished article, such that the finished article is constituted by the base device and the article manufactured on top of the base device.

In some embodiments, the base device 220 is a previously manufactured article in need of repair, and the article 230 manufactured on the of the base device 220 is the required reparation of the article.

The positioning of the base device 220 generally needs to be precisely known, in order to accurately manufacture the article on top of the base device 220 without having any part of the article misaligned with the base device. In some embodiments, the level of precision is approximately +/−100 microns.

The figure further shows an article 230 manufactured on top of the base device 220, comprising a support 250 for an overhang portion 235. The figure further shows an insert 240, which will be described more in detail later.

Figure 2:
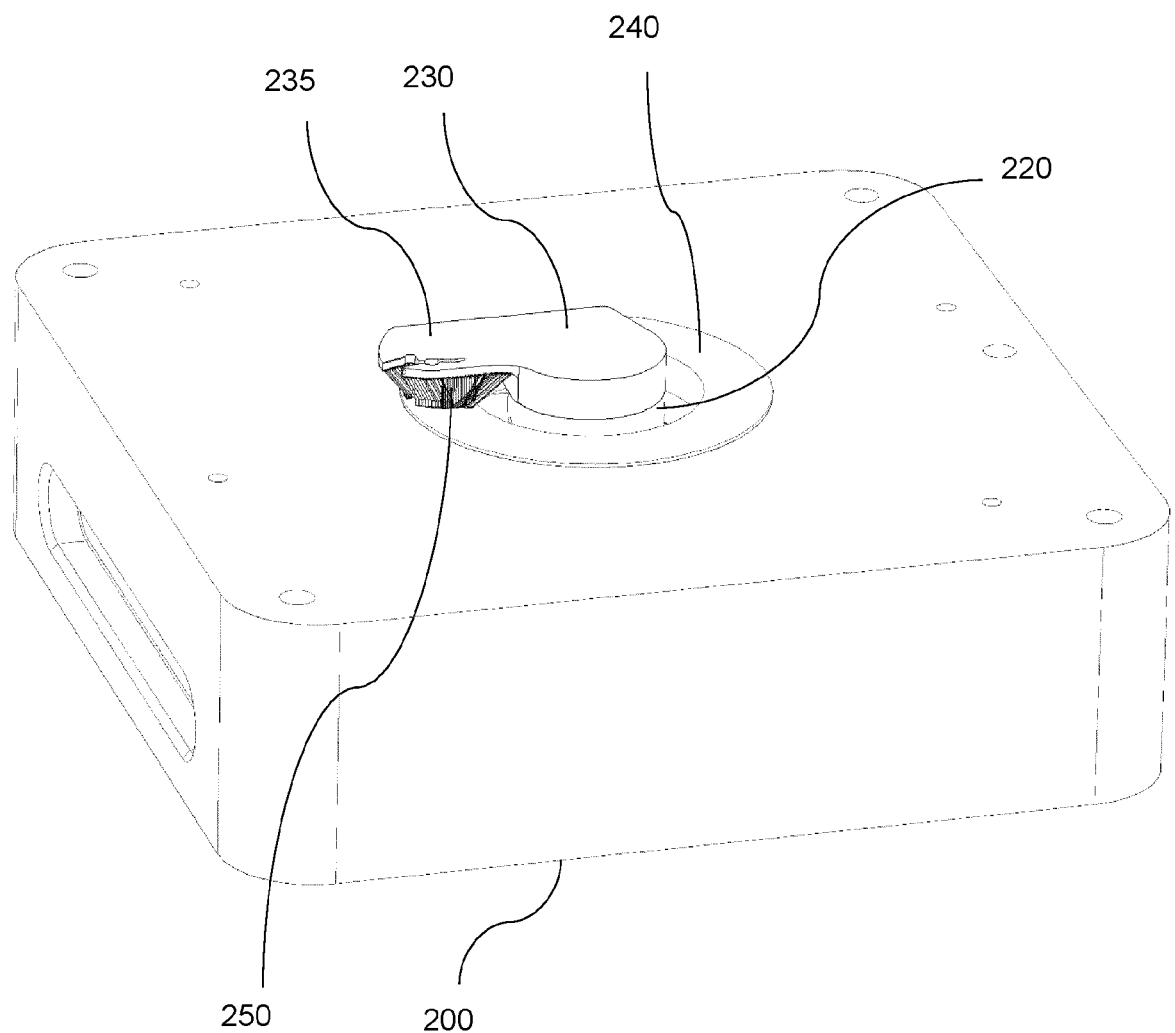
FIG. 2 shows a view of a build plate according to another embodiment.

Looking now at FIG. 2, another view of the build plate 200 is shown, without cross-section.

The build plate 200 comprises the insert 240, provided in proximity of the base device 220 and adapted for having a support 250 printed thereon. In some embodiments, the insert 240 may be fastened on the build plate using any type of fastening devices, such as screws. In some embodiments, the build plate 200 may comprise a recess for receiving the insert 240, and the insert is fastened by being positioned in the recess.

The shape and form of the insert 240 is adapted to the base device 220 and is positioned based on where the support 250 is required. As will be understood, the insert 240 may have any shape and form as long as it can provide the functionality of having a support 250 for the article printed thereon. Thus, the position and shape of the insert 240 depends on where the support 250 for the article needs to be manufactured as well as on the base device 220. In some embodiments, the position of the insert 240 may be directly below the portion of the article requiring support. In some embodiments, the support is printed at an angle, and in such embodiments the insert 240 can be provided at an angle relative to the portion requiring support.

In some embodiments, the insert 240 surrounds the base device 220. In some embodiments, the insert 240 is a circular or semi-circular insert surrounding the base device 220.

In some embodiments, the insert is provided such that there is a gap in between the insert 240 and the base device 220, with different reflective characteristics compared to the insert 240. The difference in reflective characteristics may be a result of a height difference, which is achieved by having the aforementioned gap between the insert 240 and the base device 220. The reason for having a difference in reflective characteristics is that this difference is used for finding the position of the base device 220, which is then used for accurately positioning the article 230 on the base device 220.

In some embodiments, the gap between the insert and the base device is 2-10 mm wide, preferably around 5 mm. In some embodiments, the gap between the insert and the base device is 5-15 mm deep, preferably around 10 mm.

FIG. 2 also shows a support 250 for the article 230 being manufactured on top of the base device 220. The support 250 is manufactured directly onto the insert 240, such that no part of the support 250 is in contact with the underlying build plate 200. As can be seen, the article 230 of FIG. 2 comprises an overhang portion 235, and the support 250 supports the overhang portion 235.

The support 250 is typically manufactured in the same process as the article is manufactured, using the same powder, but it may differ in characteristics from the article. For example, the support 250 may be manufactured with a raster structure, which requires less time and less material than a solid structure. The different structure of the support 250 may be achieved by e.g. using a different energy source and/or by applying the energy source differently on the support 250 as compared to the article 230.

In some embodiments, the build plate 200 may further comprise a cover layer 260. The cover layer 260 is provided on top of the build plate 200, and acts as an additional intermediate layer between the article 230 and the underlying build plate 200. The cover layer 260 may be adapted to have cutouts or recesses for receiving the inserts, thus making the positioning as well as the removal of the inserts easier.

In some embodiments, the top of the insert 240 and the top of the cover layer 260 are provided within a distance of between one and ten printing layers, preferably between 1-5 printing layers.

Figure 3:
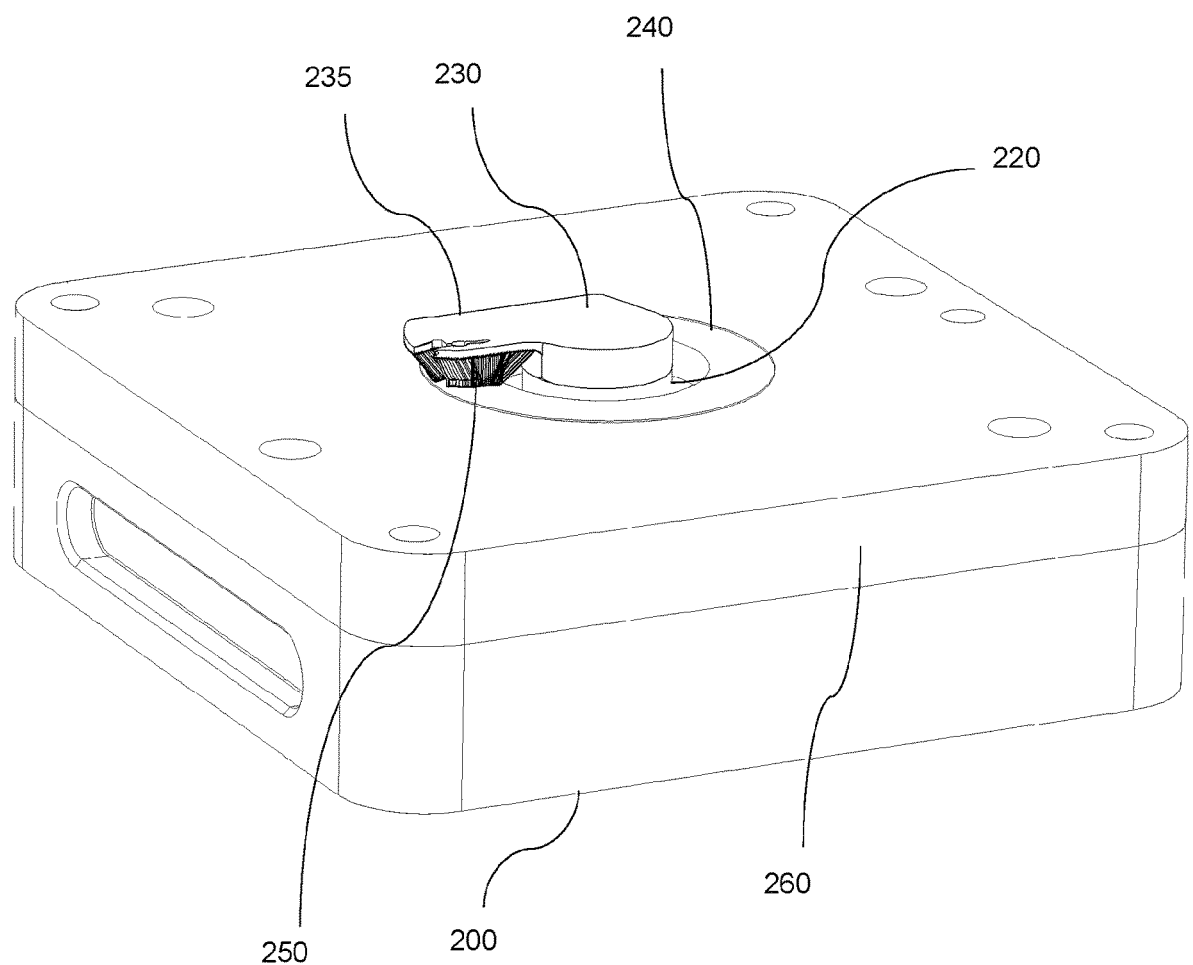
FIG. 3 shows another embodiment of a build plate, further comprising a cover layer.

Looking now at FIG. 3, another embodiment of the build plate 200 is shown, further comprising a cover layer 260. The cover layer 260 is an intermediate layer between the build plate and the article 230, intended to cover the build plate 200 such that any loose powder or similar falls on the cover layer 260 instead of on the build plate 200. Typically, the impact of loose powder on the build plate is much less than the impact of manufacturing a structure directly onto the build plate, but may still cause reprocessing to be required. Thus, one of the underlying principles for having a cover layer is similar to the one for the insert 240, i.e. to protect the underlying build plate 200 such that it doesn't need to be reprocessed in between manufacturing operations, but in the case of loose powder rather than a printed structure.

An additional purpose of the cover layer 260 is to fill up space and provide a more level surface for the manufacturing process. Before any manufacturing using additive manufacturing processes is performed, it may be required to fill the build plate with powder, such that all components are provided at substantially the same level. By having a cover layer 260, this function can be provided by the cover layer 260, at least to some extent, and decrease the need for additional powder for levelling purposes.

Figure 4:
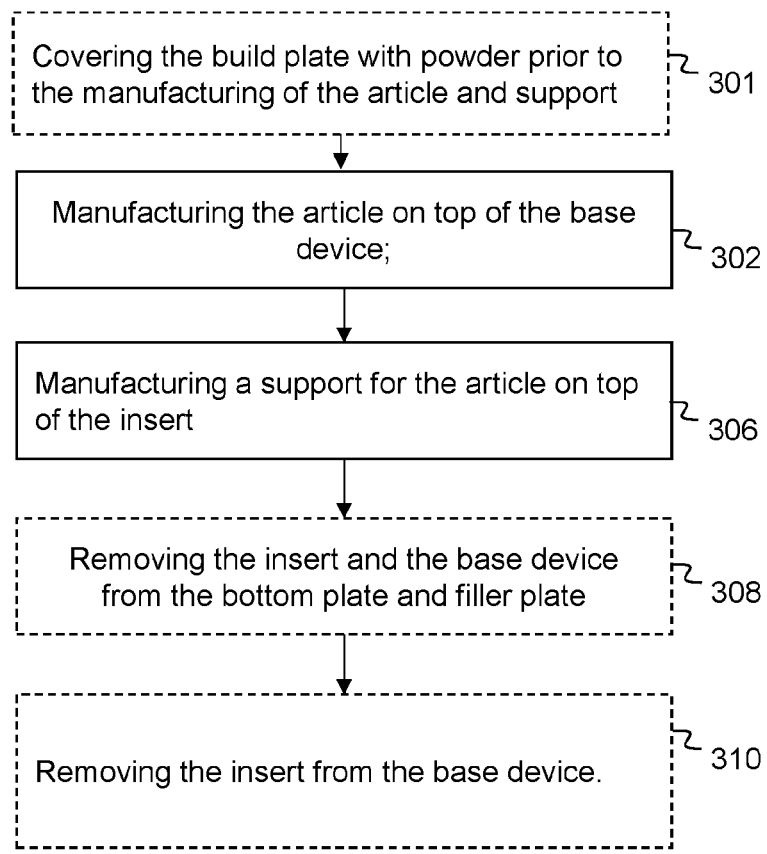
FIG. 4 schematically shows steps of a method according to an embodiment.

Looking now at FIG. 4, in conjunction with FIGS. 1 and 2, the steps of a method for manufacturing an article using an additive manufacturing process in an additive manufacturing device will now be described.

The method comprises manufacturing 302 the article 230 on top of the base device 220, using the additive manufacturing process. The additive manufacturing process may be any additive manufacturing process, but is preferably one employing a Powder Bed Fusion, PBF, process.

Since the completed product is a combined article comprising both the article 230 and the base device 220, it is important that the precision of the process is very high, such that there is no misalignment between the base device 220 and the article 230.

The method further comprising manufacturing 306 a support 250 for the article 230 on top of the insert 240. The support 250 is needed in order for enabling the article 230 to be manufactured, or at least to be manufactured without distortion. In some embodiments, the support 250 is adapted to support an overhang portion 235 of the article.

In some embodiments, the support 250 and the parts of the article 230 that are on the same layer are manufactured in the same additive manufacturing process. In some embodiments, the support 250 and the parts of the article 230 that are on the same layer are manufactured simultaneously. In some embodiments, the characteristics of the support differs from the characteristics of the article 230, for example the support 250 may be manufactured with a lower density than the article 230. In some embodiments, the support 250 is manufactured using a different technique than the article 230, for example by employing an energy source differently.

After the manufacturing process has been completed, the entire article as well as the support 250 has been manufactured on top of the base device 220. At this point, the method may be finished, but in some embodiments it may comprise additional steps.

The method may further comprise removing 308 the insert and the base device from the bottom plate, and optionally from the cover layer as well in embodiments where the build plate comprises a cover layer. Typically, removing 308 the insert and base plate comprises lifting the insert 308, and since the base device 220 is attached to the insert 308, everything else follows as well.

The method may further comprise removing 310 the insert from the base device and/or the article, or from the finished hybrid article. In some embodiments, removing 310 the insert from the base device is performed simultaneously as post-machining of the article. The step of removing 310 the insert from the base device may be performed by any relevant technology, such as grinding, cutting, breaking, or pinching with pliers.

In some embodiments, the method may further comprise a step of covering 301 the build plate with powder prior to the manufacturing of the article and support, in order to provide a level surface for the manufacturing process. In some embodiments, this entails covering the build plate with powder up to the same height as the top of the base device.

In some embodiments, this may be preceded by a step of adjusting the base device and/or insert such that the top of the base device is higher than the position of the insert. In embodiments comprising a cover layer, this step may be performed such that there is no part of the cover layer which protrudes above the powder after the step has been performed.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for manufacturing an article requiring support on top of a base device using an additive manufacturing process in an additive manufacturing device, the additive manufacturing device comprising a build plate comprising:
a receptacle arranged for receiving the base device;
an insert, provided in proximity to the base device, the insert being arranged for having a support for the article manufactured thereon; and
a cover layer, provided on top of the build plate and having a recess for the base device, the receptacle and the insert, wherein the method comprises the steps of:
manufacturing the article on top of the base device; and
manufacturing the support for the article on top of the insert.

2. The method according to claim 1, wherein the steps of manufacturing the article and manufacturing the support are performed simultaneously.

3. The method according to claim 1, wherein the article includes an overhang portion and the support is arranged to support the overhang portion.

4. The method according to claim 1, wherein the support is a more porous structure than the article.

5. The method according to claim 1, further comprising the step of removing the insert and the base device including the manufactured article from the build plate.

6. The method according to claim 1, wherein a top of the insert and a top of the cover layer are provided within a distance of approximately five printing layers from one another.

7. The method according to claim 1, further comprising the step of covering the build plate with powder prior to the manufacturing of the article and support, in order to provide a level surface for the manufacturing process.

* * * * *